(12) United States Patent
Osawa (10) Patent No.: US 8,994,835 B2
(45) Date of Patent: Mar. 31, 2015

(54) EXPOSURE CONTROL TECHNIQUE FOR IMAGE CAPTURING APPARATUS AND METHOD OF CONTROLLING SAME

(71) Applicant: Canon Kabushiki Kaisha, Tokyo (JP)

(72) Inventor: Toshifumi Osawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 37 days.

(21) Appl. No.: 13/859,315

(22) Filed: Apr. 9, 2013

(65) Prior Publication Data

US 2013/0293729 A1    Nov. 7, 2013

(30) Foreign Application Priority Data

May 2, 2012    (JP) .................................. 2012-105469

(51) Int. Cl.
*H04N 5/228*    (2006.01)
*H04N 5/232*    (2006.01)
*H04N 5/235*    (2006.01)

(52) U.S. Cl.
CPC ........... *H04N 5/23248* (2013.01); *H04N 5/235* (2013.01); *H04N 5/23258* (2013.01)
USPC ................. 348/208.12; 348/208.16

(58) Field of Classification Search
CPC .................................................. H04N 5/2327
USPC ....................... 348/208.12, 208.16
See application file for complete search history.

(56) References Cited

U.S. PATENT DOCUMENTS

| 7,565,068 | B2 * | 7/2009 | Endo ............................... 396/52 |
| 7,657,164 | B2 * | 2/2010 | Nomura et al. .................. 396/55 |
| 7,777,191 | B2 * | 8/2010 | Olcott et al. ............. 250/363.07 |
| 8,237,803 | B2 * | 8/2012 | Yumiki ....................... 348/208.4 |
| 8,279,290 | B2 * | 10/2012 | Yamanaka ................. 348/208.5 |
| 8,497,916 | B2 * | 7/2013 | Ogura ........................ 348/208.6 |
| 2009/0180770 | A1 * | 7/2009 | Honjo et al. .................... 396/55 |

FOREIGN PATENT DOCUMENTS

JP    4046836 B    2/2008

* cited by examiner

*Primary Examiner* — Albert Cutler
(74) *Attorney, Agent, or Firm* — Cowan, Liebowitz & Latman, P.C.

(57) ABSTRACT

An image capturing apparatus receives shake information detected by, for example, a sensor which detects a shake, and determines whether the hold status of the image capturing apparatus is handheld or fixed, based on the shake information (first shake determination). Also, the image capturing apparatus sequentially acquires images output upon photoelectric conversion by charge-accumulation type photoelectric conversion elements, and determines whether the hold status is handheld or fixed, based on an image displacement between the images (second shake determination). The exposure settings at the time of image capturing are changed between the case wherein it is determined by first shake determination that the hold status is fixed, and that wherein it is determined by second shake determination that the hold status is fixed.

19 Claims, 6 Drawing Sheets

EXPOSURE CONTROL TECHNIQUE FOR IMAGE CAPTURING APPARATUS AND METHOD OF CONTROLLING SAME

BACKGROUND OF THE INVENTION

1. Field of the Invention

The present invention relates to an image capturing apparatus and a control method and, particularly, to an exposure control technique in an image capturing apparatus.

2. Description of the Related Art

In an image capturing apparatus such as a digital camera, exposure control is performed to change the exposure settings at the time of image capturing in accordance with the brightness of a subject. More specifically, in, for example, landscape image capturing during the daytime in which an overall subject is bright, the sensitivity of an image sensor is set low, the shutter speed is set high (the exposure time is set short), and the aperture value is set large. Also, in, for example, night scene image capturing in which an overall subject is dark, the sensitivity of an image sensor is set high, the shutter speed is set low (the exposure time is set long), and the aperture value is set small.

In image capturing under the condition in which the shutter speed is set relatively low (the exposure time is set relatively long), as in a night scene, it is desired to use a tripod to obtain a satisfactory image capturing result. This is because, for example, the exposure time at the time of night scene image capturing is longer than that required in the daytime. That is, during a long exposure time, a displacement of an optical image formed on an image sensor occurs due, for example, to a camera shake of a photographer who grips an image capturing apparatus, so the sharpness of the image capturing result is lost.

To solve this problem, Japanese Patent No. 4046836 discloses an image capturing apparatus which sets an image capturing mode suitable for image capturing using a tripod when it is determined that the image capturing apparatus is fixed on, for example, a tripod and does not vibrate, based on the detection result of vibration (shake) of the image capturing apparatus.

When the image capturing apparatus is, for example, an exchangeable lens type digital camera, the shake detection method changes depending on whether an exchangeable lens includes a shake sensor which detects a camera shake, such as a gyro. That is, when the exchangeable lens includes no shake sensor, a camera shake can be detected by detecting, as a motion vector, a displacement of an optical image formed on an image sensor as the apparatus vibrates.

However, a method of detecting a shake using a motion vector has a reliability lower than that of a method of detecting a shake using a sensor which detects a shake. This is because it is difficult to, for example, discriminate between a subject motion and a camera motion (camera shake), and isolate them from each other.

Therefore, the exposure settings are preferably changed between the case wherein a shake is detected using a motion vector and that wherein a shake is detected using a sensor.

SUMMARY OF THE INVENTION

The present invention has been made in consideration of the above-mentioned problem in the conventional technique. The present invention provides an image capturing apparatus and a control method which change the exposure settings in accordance with the shake detection method.

The present invention in its first aspect provides an image capturing apparatus comprising: a first shake determination unit configured to receive shake information detected by a shake detection unit, and determine whether a shake amount of the image capturing apparatus is smaller than a first predetermined amount, based on the shake information; a second shake determination unit configured to determine whether the shake amount of the image capturing apparatus is smaller than a second predetermined amount, based on a motion vector obtained based on an image displacement between images; and an exposure control unit configured to control exposure at a time of image capturing, wherein the exposure control unit changes the exposure at the time of image capturing between a case where the first shake determination unit determines that the shake amount of the image capturing apparatus is smaller than the first predetermined amount, and a case where the second shake determination unit determines that the shake amount of the image capturing apparatus is smaller than the second predetermined amount.

Further features of the present invention will become apparent from the following description of exemplary embodiments with reference to the attached drawings.

DESCRIPTION OF THE EMBODIMENTS

Embodiment

An exemplary embodiment of the present invention will be described in detail below with reference to the accompanying drawings. Note that an example in which the present invention is applied to a so-called single-lens reflex digital camera capable of lens exchange, which exemplifies an image capturing apparatus, will be given in one embodiment to be described hereinafter. The single-lens reflex camera in this embodiment detects a shake based on shake information received from a shake detection sensor provided in the exchangeable lens, and motion vector information between images obtained from an image sensor provided in the main body. However, the present invention is also applicable to an image capturing apparatus including a so-called single-lens reflex shake detection sensor in the main body.

<<Configurations of Digital Camera 100 and Exchangeable Lens 200>>

Figure 1:
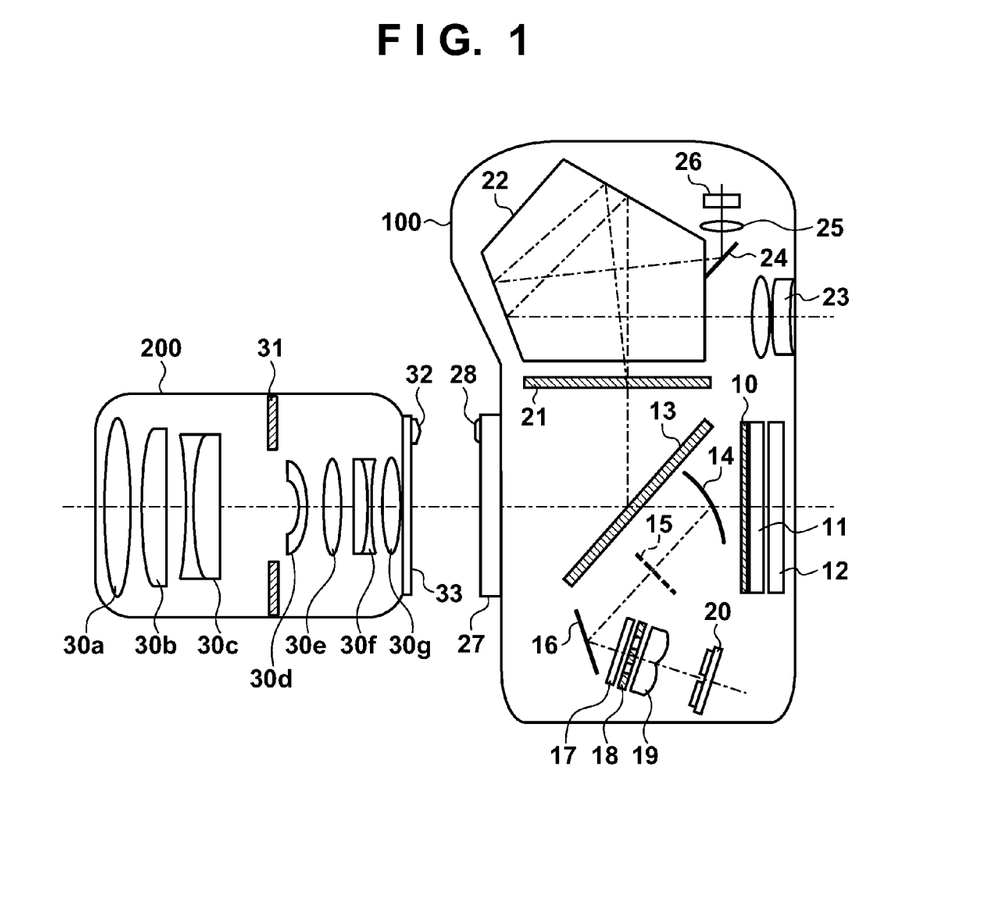
FIG. 1 is a view showing the configurations of a digital camera 100 and an exchangeable lens 200 according to an embodiment of the present invention.

FIG. 1 is a view showing the configurations of a digital camera 100 and an exchangeable lens 200 according to an embodiment of the present invention. Note that in the configuration of the digital camera 100 and exchangeable lens 200 in FIG. 1, members including circuits and motors for driving optical members are not shown.

<Configuration of Digital Camera 100>

Light incident on the digital camera 100 via the exchangeable lens 200 forms an image on an image sensor 12 via a mechanical shutter 10 and an optical lowpass filter 11, as shown in FIG. 1. The image sensor 12 is, for example, a CCD or CMOS sensor, and is formed by two-dimensionally arraying charge-accumulation type photoelectric conversion elements.

Also, a main mirror 13 and a first reflecting mirror 14 are arranged on the optical axis. When an optical image is formed on the image sensor 12, these optical members are moved away from the optical axis.

The main mirror 13 is a semitransparent, so-called half mirror. Light reflected by the main mirror 13 is diffused by a focusing plate 21, and strikes a pentaprism 22. The pentaprism 22 reflects the diffused, incident light beam, and guides it to an eyepiece 23 serving as an optical viewfinder, and a photometric sensor 26 which measures the luminance distribution to be captured. Note that the use of an image capturing apparatus with neither a main mirror 13 nor a first reflecting mirror 14 does not influence the practice of the present invention.

Figure 3:
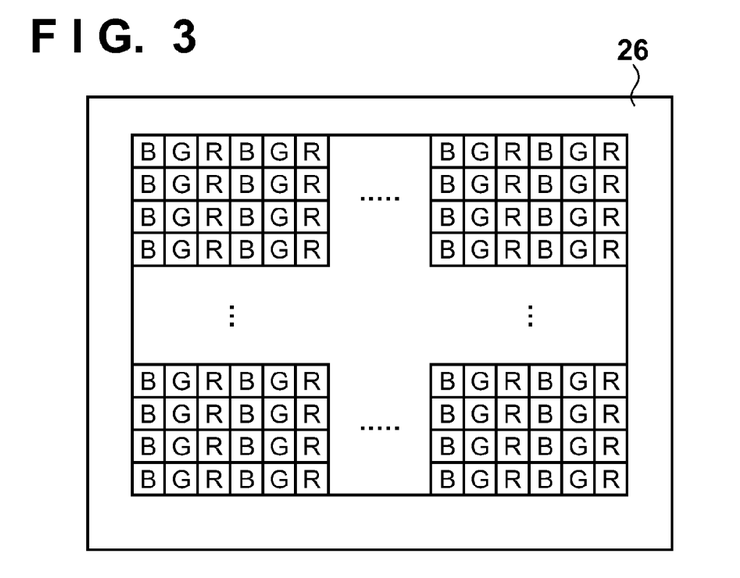
FIG. 3 is a view for explaining the structure of a photometric sensor 26 according to the embodiment of the present invention.

The photometric sensor 26 is, for example, a CCD or CMOS sensor, and is formed by two-dimensionally arraying charge-accumulation type photoelectric conversion elements, like the image sensor 12. In this embodiment, the photometric sensor 26 is provided with color filters to divide a light-receiving unit into a plurality of parts, as shown in FIG. 3, so that the individual charge-accumulation type photoelectric conversion elements have different spectral sensitivities. That is, by arraying color filters in the above-mentioned arrangement, the photometric sensor 26 can output the luminance information and color information of a subject. Note that in an example shown in FIG. 3, filters of the so-called primary colors: R (Red), G (Green), and B (Blue) are arranged in a striped pattern. The number of pixels of the photometric sensor 26 is determined in accordance with the resolution required in motion vector detection (to be described later), and is, for example, about several thousand to several ten thousand. Also, the photometric sensor 26 includes not only photoelectric conversion elements but also, for example, a signal amplifier circuit and a signal processing circuit on the same chip as an integrated circuit. Note that a light beam incident on the photometric sensor 26 is refracted by a third reflecting mirror 24, is focused by a condenser lens 25, and enters the photometric sensor 26.

Also, light reflected by the first reflecting mirror 14 is refracted by a second reflecting mirror 16 farther than a paraxial imaging plane 15 at a position optically conjugate to the image sensor 12, and forms an image on a focus detection sensor 20 via an infrared cut filter 17, a stop 18, and a secondary imaging lens 19.

Figure 2:
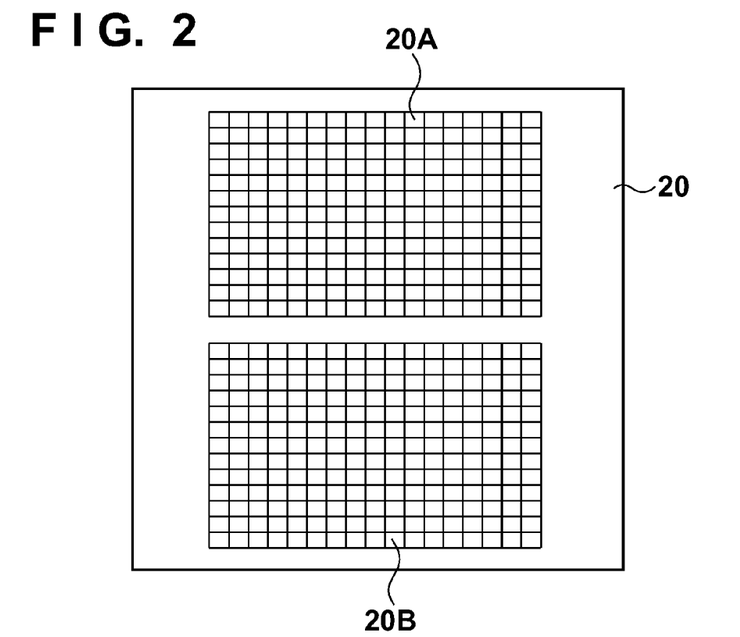
FIG. 2 is a view for explaining the structure of a focus detection sensor 20 according to the embodiment of the present invention.

The focus detection sensor 20 is, for example, a CCD or CMOS sensor, and is formed by two-dimensionally arraying charge-accumulation type photoelectric conversion elements, like the image sensor 12 and photometric sensor 26. In this embodiment, the focus detection sensor 20 is formed by two types of photoelectric conversion element groups 20A and 20B, as shown in FIG. 2. The stop 18 has two apertures, and light beams having passed through the respective apertures form images on the photoelectric conversion element groups 20A and 20B, respectively, via the secondary imaging lens 19. The focus detection sensor 20 detects the degree of focusing at an arbitrary position based on the amount of relative displacement between the images output from the photoelectric conversion element groups 20A and 20B. The focus detection sensor 20 includes not only photoelectric conversion elements but also, for example, a signal accumulation portion and a signal processing circuit on the same chip as an integrated circuit.

The digital camera 100 moreover includes a mount portion 27 on which the exchangeable lens 200 is mounted, and a contact point 28 for information communication with the circuits provided in the exchangeable lens 200.

<Configuration of Exchangeable Lens 200>

The exchangeable lens 200 includes various optical lenses 30a to 30g, as shown in FIG. 1. In this embodiment, the exchangeable lens 200 is a lens having a so-called camera shake correction function, and the optical lenses 30 include the image blur correction lens 30f (shift lens) serving as a correction member for image blur correction. An image blur due to a camera shake is reduced by shifting the image blur correction lens 30f in two axial directions, that is, the vertical and horizontal directions perpendicular to the image capturing optical axis, in accordance with the detected camera shake.

The exchangeable lens 200 includes not only the optical lenses 30, but also a stop 31, a contact point 32 for information communication with the circuits provided in the digital camera 100, and a mount portion 33 on the side of the exchangeable lens 200 corresponding to the mount portion 27 of the digital camera 100.

<<Functional Configurations of Digital Camera 100 and Exchangeable Lens 200>>

Figure 4:
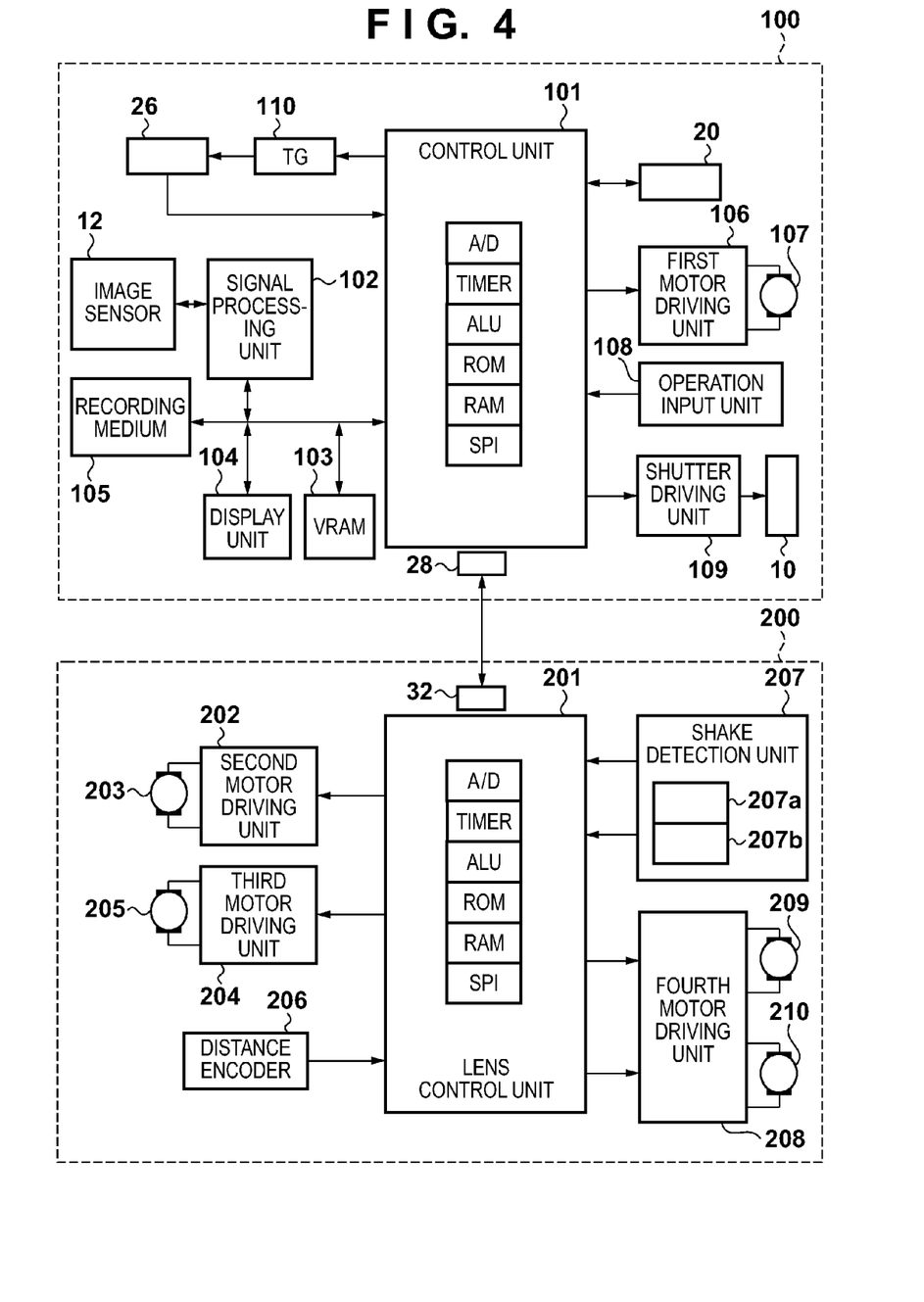
FIG. 4 is a block diagram showing the functional configurations of the digital camera 100 and exchangeable lens 200 according to the embodiment of the present invention.

The functional configurations of the digital camera 100 and exchangeable lens 200 will be described in more detail below with reference to FIG. 4.

<Functional Configuration of Digital Camera 100>

A control unit 101 is a one-chip microcomputer including, for example, an ALU, ROM, RAM, A/D converter, timer, and serial communication port (SPI), and controls the operation of each block of the digital camera 100. More specifically, the control unit 101 reads out an operating program for image capturing processing (to be described later), stored in the internal ROM, expands it into the internal RAM, and executes it, thereby controlling the operation of each block. In this embodiment, the focus detection sensor 20 and photometric sensor 26 are connected to the A/D converter of the control unit 101, and a signal output from each sensor is converted into digital data by the A/D converter. The photometric sensor 26 controls a charge accumulation operation and a readout operation in accordance with a timing signal generated by a timing generator 110 under the control of the control unit 101. Also, the contact point 28 is connected to the SPI of the control unit 101, and the control unit 101 performs, using serial communication, information communication with a lens control unit 201 of the exchangeable lens 200 (to be described later), which is connected to it via the contact points 28 and 32.

A signal processing unit 102 performs various types of signal processing in the digital camera 100. More specifically, the signal processing unit 102 applies A/D conversion processing to an analog image signal output from the image sensor 12 upon photoelectric conversion of an optical image, and outputs a digital image signal. Also, the signal processing unit 102 applies, for example, encoding processing corresponding to a preset encoding scheme in response to an image signal record instruction, and outputs an encoded image data signal. Moreover, the signal processing unit 102 divides one frame into a plurality of regions, extracts the white region of a subject based on a color difference signal in each region, and performs gain correction of red and blue channels in the entire frame based on the signals in the extracted regions, thereby performing white balance adjustment processing.

A VRAM 103 is, for example, a DRAM, and is used as a working memory for signal processing in the signal processing unit 102, or as a temporary storage area for an image signal displayed on a display unit 104.

The display unit 104 is a display provided in the digital camera 100, such as an LCD. The display unit 104 displays an image obtained by image capturing, or an image capturing signal in a live view mode (electronic viewfinder function).

A recording medium 105 is a nonvolatile internal memory, which is provided in the digital camera 100, or a recording device, which is detachably connected to the digital camera 100, such as a flash memory, a memory card, or an HDD. The recording medium 105 stores, in the form of an image file, image data obtained by applying encoding processing in the signal processing unit 102.

A first motor driving unit 106 controls the driving of a first motor 107 under the control of the control unit 101. The first motor 107 serves to perform movement associated with the arrangement of the main mirror 13 and first reflecting mirror 14 on the optical axis, and their removal from the optical axis, or to set the mechanical shutter 10 in a shutter charge state.

An operation input unit 108 is a user interface, provided in the digital camera 100, such as a release switch or a live view start switch. When the operation input unit 108 detects that the user has operated the user interface, it outputs a corresponding control signal to the control unit 101.

A shutter driving unit 109 opens/closes the mechanical shutter 10, which is set in a shutter charge state by the first motor 107, in accordance with the control signal output from the control unit 101, and exposes the image sensor 12 for a time defined by the shutter speed.

<Functional Configuration of Exchangeable Lens 200>

Like the control unit 101, the lens control unit 201 is a one-chip microcomputer including, for example, an ALU, ROM, RAM, A/D converter, timer, and serial communication port (SPI), and controls the operation of each block of the exchangeable lens 200. More specifically, the lens control unit 201 reads out an operating program for each block (to be described later), stored in the internal ROM, expands it into the internal RAM, and executes it, thereby controlling the operation of this block. In this embodiment, a distance encoder 206 is connected to the A/D converter of the lens control unit 201, and a signal output from the distance encoder 206 is converted into digital data by the A/D converter. Note that the signal output from the distance encoder 206 may be a digital signal such as a gray code pattern signal. Also, the contact point 32 is connected to the SPI of the lens control unit 201, and the lens control unit 201 performs, using serial communication, information communication with the control unit 101 of the digital camera 100, which is connected to it via the contact points 28 and 32.

A second motor driving unit 202 controls the driving of a second motor 203. The second motor 203 drives a focus lens, associated with a focusing operation, of the optical lenses 30. When the lens control unit 201 receives a focusing operation instruction from the control unit 101, it issues a focus lens drive instruction to the second motor driving unit 202 in response to the received instruction to drive the second motor 203. The information of the current position of the focus lens is detected by the distance encoder 206. The distance encoder 206 outputs the amount of feed of the focus lens to the lens control unit 201.

A third motor driving unit 204 controls the driving of a third motor 205. The third motor 205 opens/closes the stop 31. When the lens control unit 201 receives the information of the aperture value set from the control unit 101, it issues a stop open/close instruction to the third motor driving unit 204 in response to the received instruction to drive the third motor 205.

A shake detection unit 207 is a shake detection sensor such as an angular velocity detection sensor including a vibration gyro sensor, or an acceleration sensor. The shake detection unit 207 includes a detector 207a which detects the angular velocity of the exchangeable lens 200 in the vertical direction (pitch direction) while it is mounted on the digital camera 100, and a detector 207b which detects the angular velocity of the exchangeable lens 200 in the horizontal direction (yaw direction) while it is mounted on the digital camera 100. The shake detection unit 207 is connected to the A/D converter of the control unit 101. A signal output from the shake detection unit 207 is converted into a digital signal, and further converted into an angular displacement of the exchangeable lens 200, that is, the tilt angle of the exchangeable lens 200 in the vertical and horizontal directions by integral calculation.

A fourth motor driving unit 208 controls the driving of a fourth motor 209 and a fifth motor 210. The fourth motor 209 and fifth motor 210 drive the image blur correction lens 30f of the optical lenses 30 in the vertical and horizontal directions within a plane perpendicular to the image capturing optical axis. The driving amounts (shift amounts) of the fourth motor 209 and fifth motor 210 are determined by the lens control unit 201 in accordance with the information of the tilt angle of the exchangeable lens 200 obtained by converting the signal output from the shake detection unit 207 by the lens control unit 201, and are transmitted to the fourth motor driving unit 208.

<Serial Communication between Digital Camera 100 and Exchangeable Lens 200>

As described above, in this embodiment, the digital camera 100 and exchangeable lens 200 perform data communication using serial communication via the contact points 28 and 32 while the exchangeable lens 200 is mounted on the digital camera 100.

The lens control unit 201 of the exchangeable lens 200 transmits to the digital camera 100 various types of information including optical information (lens information) unique to the exchangeable lens 200, which is required in focus detection and exposure calculation in the digital camera 100, and subject distance information based on the distance encoder 206. Also, the control unit 101 of the digital camera 100 transmits to the exchangeable lens 200 stop information and focus adjustment information obtained as a result of focus detection and exposure calculation. At this time, the lens control unit 201 controls the second motor driving unit 202 to drive the focus lens in accordance with the focus adjustment information, and controls the third motor driving unit 204 to drive the stop 31 in accordance with the stop information.

Also, when the lens control unit 201 of the exchangeable lens 200 receives a shake information acquire request from the digital camera 100, it transmits a detection signal from the shake detection unit 207 to the digital camera 100 as shake information. Note that this embodiment assumes that a signal output from the shake detection unit 207 is transmitted from the exchangeable lens 200 to the digital camera 100 as shake information, and the control unit 101 determines the presence/absence of a shake of the digital camera 100 based on the received information. The practice of the present invention is not limited to this, and the control unit 101 may be configured to receive the determination result of the presence/absence of a shake of the digital camera 100.

<Image Capturing Sequence>

In the digital camera 100 according to this embodiment with the above-mentioned configuration, a series of image capturing sequences executed when the control unit 101 receives from the operation input unit 108 a control signal indicating that the user has issued an image capture instruction will be described below.

First, the control unit 101 outputs a control signal to the first motor driving unit 106 to make it control the driving of the first motor 107 so as to flip up and remove the main mirror 13 and first reflecting mirror 14 from the optical path.

The control unit 101 further transmits via the contact point 28 the information of the aperture value of the exposure settings determined in the lens control unit 201 of the exchangeable lens 200. The lens control unit 201 makes the third motor driving unit 204 drive the third motor 205 in accordance with the received information of the aperture value to control the open/closed state of the stop 31.

Upon detecting an image capture instruction, the control unit 101 transmits a control signal to the shutter driving unit 109 to open the mechanical shutter 10 and expose the image sensor 12 for a time (charge accumulation time) defined by the shutter speed of the determined exposure settings. At this time, the control unit 101 controls the operation of the signal processing unit 102 so that the image sensor 12 accumulates charges for the charge accumulation time, using a readout gain defined by the sensitivity of the determined exposure settings. When the image capturing processing completes, the control unit 101 transmits a control signal to the shutter driving unit 109 to close the mechanical shutter 10. Then the mechanical shutter 10 protects the image sensor 12 from rays which pass through the optical lenses 30.

After the charge accumulation time, the control unit 101 transmits a stop maximum open instruction to the lens control unit 201 via the contact point 28, so that the stop 31 changes from a stop-down state to a full-aperture state. When the lens control unit 201 receives the stop maximum open instruction, it outputs a control signal corresponding to the stop maximum open instruction to the third motor driving unit 204 to drive the third motor 205 so that the stop 31 is set in a full-aperture state. Also, the control unit 101 outputs a control signal to the first motor driving unit 106 to control the driving of the first motor 107 so as to arrange the main mirror 13 and first reflecting mirror 14 in the optical path again, and perform mechanical charge of the mechanical shutter 10.

Note that after the charge accumulation time, the charges accumulated on the image sensor 12 are read out by the signal processing unit 102, and applied with the above-mentioned A/D conversion processing, and various types of correction or interpolation processing.

The control unit 101 makes the signal processing unit 102 apply encoding processing of the recording file format to an image signal having undergone white balance adjustment processing, and stores the obtained image data on the recording medium 105 in the form of an image file.

<<Image Capturing Processing>>

Figure 5:
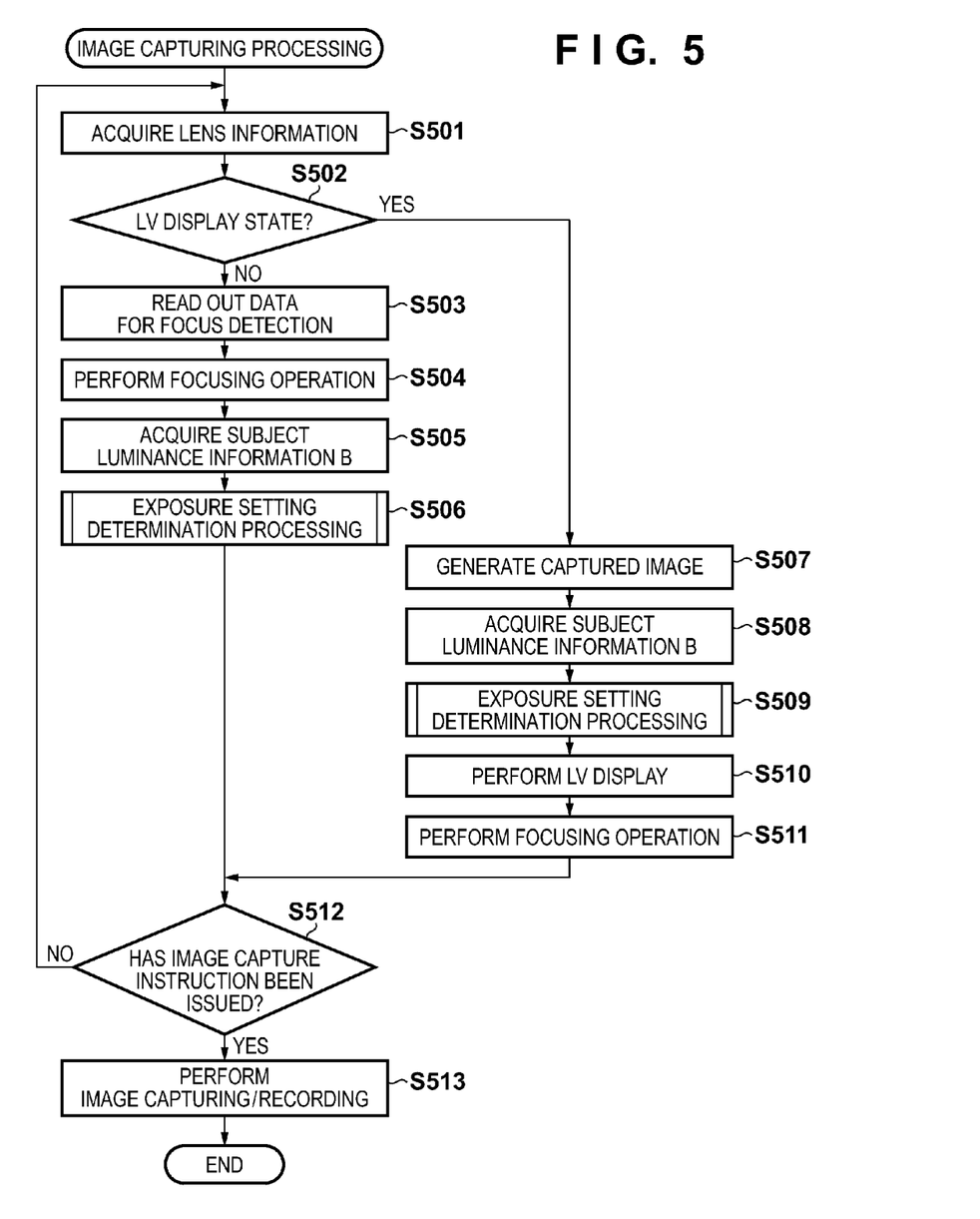
FIG. 5 is a flowchart illustrating image capturing processing executed by the digital camera 100 according to the embodiment of the present invention.

Details of image capturing processing of the digital camera 100 according to this embodiment with the above-mentioned configuration, which is executed by the control unit 101, will be described with reference to a flowchart shown in FIG. 5.

Note that this image capturing processing starts as the digital camera 100 is activated in, for example, a still image capturing mode.

In step S501, the control unit 101 acquires the current setting information (lens information) of the exchangeable lens 200, which is required in a distance measurement operation and a photometry operation. More specifically, the control unit 101 transmits a lens information acquire request to the lens control unit 201 of the exchangeable lens 200 via the contact point 28. When the lens control unit 201 receives the lens information acquire request, it acquires, for example, the focal distance information, the maximum open F-number, and the focus lens information of the distance encoder 206, and transmits these pieces of information to the control unit 101 via the contact point 32 as lens information. When the control unit 101 receives the lens information, it stores it in the RAM.

In step S502, the control unit 101 determines whether the state (LV display state) in which a live view screen (electronic viewfinder image) is displayed on the display unit 104 is set. More specifically, the control unit 101 determines whether LV display on the display unit 104 has already started. If LV display has not yet started, the control unit 101 determines an LV display state/non-LV display state in accordance with whether it has received from the operation input unit 108 a control signal indicating that the user has issued an LV display instruction. If the control unit 101 determines that the LV display state is set, it advances the process to step S507; otherwise, it advances the process to step S503.

Note that if the control unit 101 has received from the operation input unit 108 a control signal indicating that the user has issued an LV display instruction, it performs an LV display preparation operation. More specifically, the control unit 101 controls the first motor driving unit 106 and shutter driving unit 109 to remove the main mirror 13 and first reflecting mirror 14 from the optical path, and set the mechanical shutter 10 in a maximum open state.

In step S503, the control unit 101 reads out from the focus detection sensor 20 data for focus detection (for example, two types of two-dimensional image data applied with A/D conversion processing and correction processing including shading). More specifically, the control unit 101 outputs a control signal to the focus detection sensor 20 to make the focus detection sensor 20 start a signal accumulation operation, and reads out the data for focus detection after the charge accumulation period.

In step S504, the control unit 101 determines a region to be focused, and moves the focus lens of the exchangeable lens 200 to perform a focusing operation for a subject included in this region. Note that the region to be focused may be, for example, set for the image capturing mode in advance or arbitrarily set by the user.

The control unit 101 acquires the amount of defocus of an image included in the region to be focused, from the data for focus detection in this region, and calculates the amount of movement of the focus lens based on the information of the amount of defocus. The control unit 101 transmits not only a focus lens drive instruction but also the amount of movement of the focus lens to the lens control unit 201 of the exchangeable lens 200 via the contact point 28. When the lens control unit 201 receives the focus lens drive instruction, it transmits the information of the amount of movement of the focus lens, received together, to the second motor driving unit 202. When the second motor driving unit 202 receives the amount of movement of the focus lens, it controls the driving of the second motor 203 to move the focus lens by this amount of movement.

Also, at this time, the setting information of the exchangeable lens 200 is updated upon movement of the focus lens, so the control unit 101 receives lens information, obtained after the focus lens moves, from the exchangeable lens 200 via the contact point 28.

In step S505, the control unit 101 divides photometric data to be captured into a predetermined number of areas, and acquires subject luminance information B in a logarithmic compression system for each area. More specifically, first, the control unit 101 controls the timing generator 110 to start a signal accumulation operation for the photometric sensor 26, and output an accumulation signal after the charge accumulation period. The control unit 101 applies A/D conversion processing to the output accumulation signal, and stores the obtained data in the RAM as photometric data (two-dimensional image data).

Next, the control unit 101 divides photometric data into a predetermined number of areas, and adds signal values for each of R, G, and B colors in each area to calculate R(i), G(i), and B(i). Note that i is the area identification number, and the control unit 101 divides photometric data into 256 (16×16) areas in this embodiment. The control unit 101 calculates subject luminance information Br(i) and pieces of subject color information Cx(i) and Cy(i) in a linear system for each area by executing matrix calculation using the obtained sum signal value of each area in accordance with:

$$\begin{bmatrix} Br(i) \\ Cx(i) \\ Cy(i) \end{bmatrix} = \begin{bmatrix} M11 & M12 & M13 \\ M21 & M22 & M23 \\ M31 & M32 & M33 \end{bmatrix} \times \begin{bmatrix} R(i) \\ G(i) \\ B(i) \end{bmatrix} \quad (1)$$

$$i = 1, 2, 3, \ldots, 256$$

The control unit 101 also acquires subject luminance information B(i) in a logarithmic compression system, which has undergone luminance correction of each area based on the optical characteristics of the exchangeable lens 200, by executing an arithmetic operation for the obtained subject luminance information Br(i) in a linear system in accordance with:

$$B(i) = \log_2 \{Br(i)\} \times S(i) \; i=1,2,3,\ldots,256 \quad (2)$$

where S(i) is a correction coefficient for luminance correction based on the optical characteristics of the exchangeable lens 200, which is set for each area. The information of the correction coefficient is included in, for example, the lens information acquired in step S501.

The control unit 101 controls the timing generator 110 using a timer so as to periodically perform the accumulation signal output and the signal accumulation operation of the photometric sensor 26 in this step at a predetermined time interval. That is, photometric data or subject luminance information B(i) is sequentially stored in the ROM at a predetermined time interval.

In step S506, the control unit 101 executes exposure setting determination processing for the subject luminance information B(i) to be captured, which is obtained in step S505, to determine the exposure settings which include the shutter speed, aperture value, and sensitivity, and are used in exposure control upon an image capture instruction.

<Exposure Setting Determination Processing>

Figure 6:
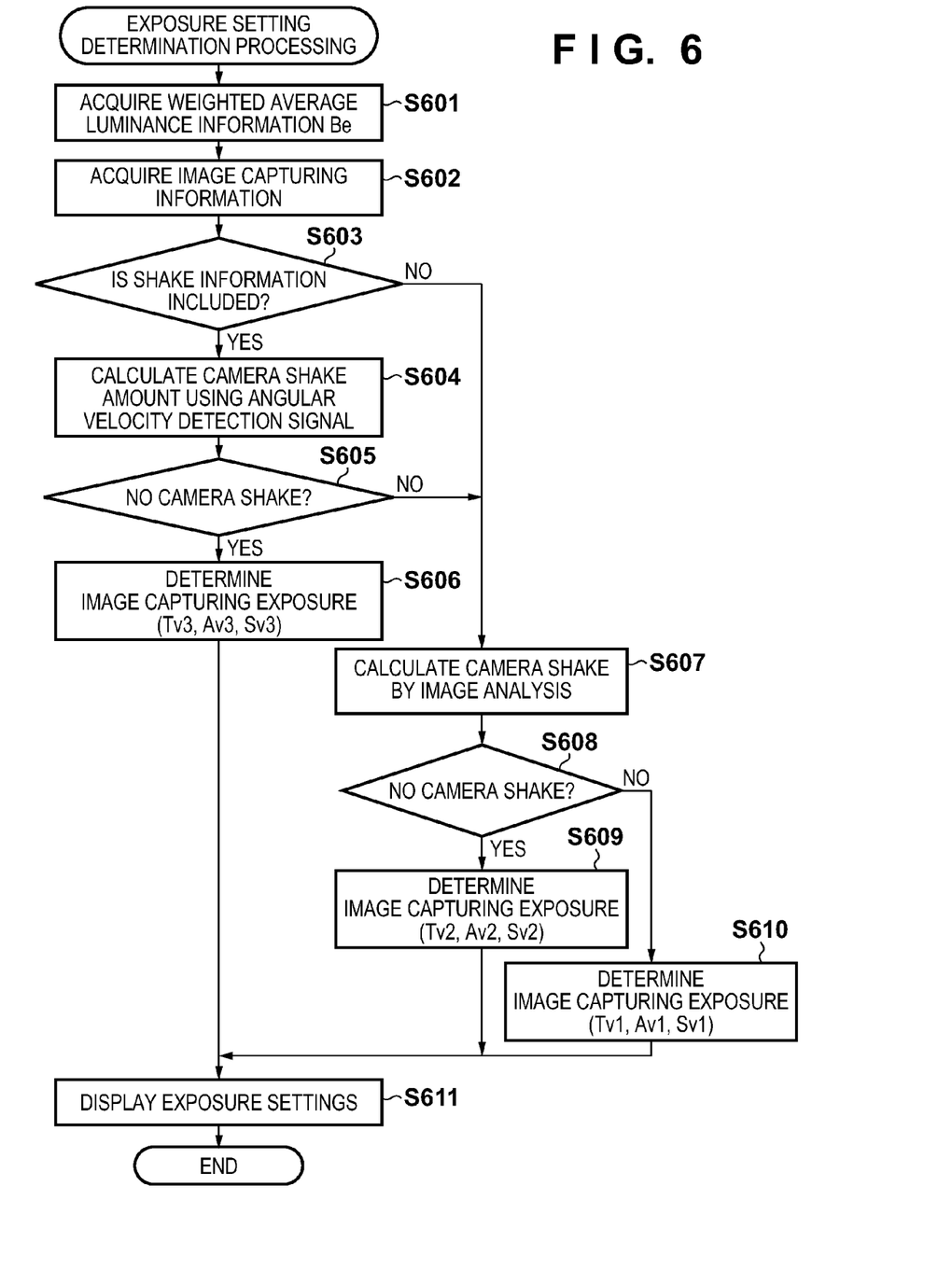
FIG. 6 is a flowchart illustrating exposure setting determination processing executed by the digital camera 100 according to the embodiment of the present invention.

Exposure setting determination processing executed by the digital camera 100 according to this embodiment will be described in detail herein with reference to a flowchart shown in FIG. 6.

In step S601, the control unit 101 calculates weighted average luminance information Be from the subject luminance information B(i) to be captured using:

$$Be = \sum_{i=1}^{256} \{W(i) \times B(i)\}$$

where W(i) is a weighting coefficient. In this embodiment, the weighting coefficient is set to a large value in an image central portion where a main subject is more likely to be present, and a focus detection region (a region with an in-focus subject), and set to a value smaller than the former value in the remaining portions. Also, the sum total of the weighting coefficient W(i) is set to 1 to calculate the weighted average.

In step S602, the control unit 101 transmits a request to acquire image capturing information indicating the current state, associated with image capturing, of the exchangeable lens 200 via the contact point 28 to receive the image capturing information from the exchangeable lens 200. The image capturing information includes the focal distance information of the exchangeable lens 200, and the in-focus subject distance information based on the output from the distance encoder 206. Also, when the exchangeable lens 200 has the shake detection unit 207, the image capturing information includes shake information serving as a detection signal of the shake detection unit 207. Note that the shake information includes a plurality of detection signals of the shake detection unit 207 as time-series data.

In step S603, the control unit 101 determines whether the image capturing information received in step S602 includes shake information. If the control unit 101 determines that the image capturing information includes shake information, it advances the process to step S604; otherwise, it advances the process to step S607.

In step S604, the control unit 101 executes predetermined signal processing (an arithmetic operation which uses an HPF or an LPF) for the time-series data of the detection signals of the shake detection unit 207, which is included in the shake information, to calculate the shake amount. Note that when the shake amount is calculated using an angular velocity detector including a vibration gyro, or an acceleration sensor, it is preferable to eliminate the influence of instantaneous disturbance noise, and low-frequency drift components included in the time-series data. Since both a shake amount calculation method which uses a sensor, and that which uses a motion vector are known, a detailed description thereof will not be given.

In step S605, the control unit 101 determines whether the shake amplitude and frequency, or the shake amounts in the vertical and horizontal directions calculated in step S604 fall within a predetermined range. More specifically, the control unit 101 determines whether both the shake amounts in the vertical and horizontal directions are smaller than thresholds set for the respective directions in advance to, in turn, determine whether they fall within a predetermined range. If the control unit 101 determines that the shake amounts fall within the predetermined range, it determines that the digital camera 100 is fixed on, for example, a tripod, and advances the process to step S606.

Figure 7:
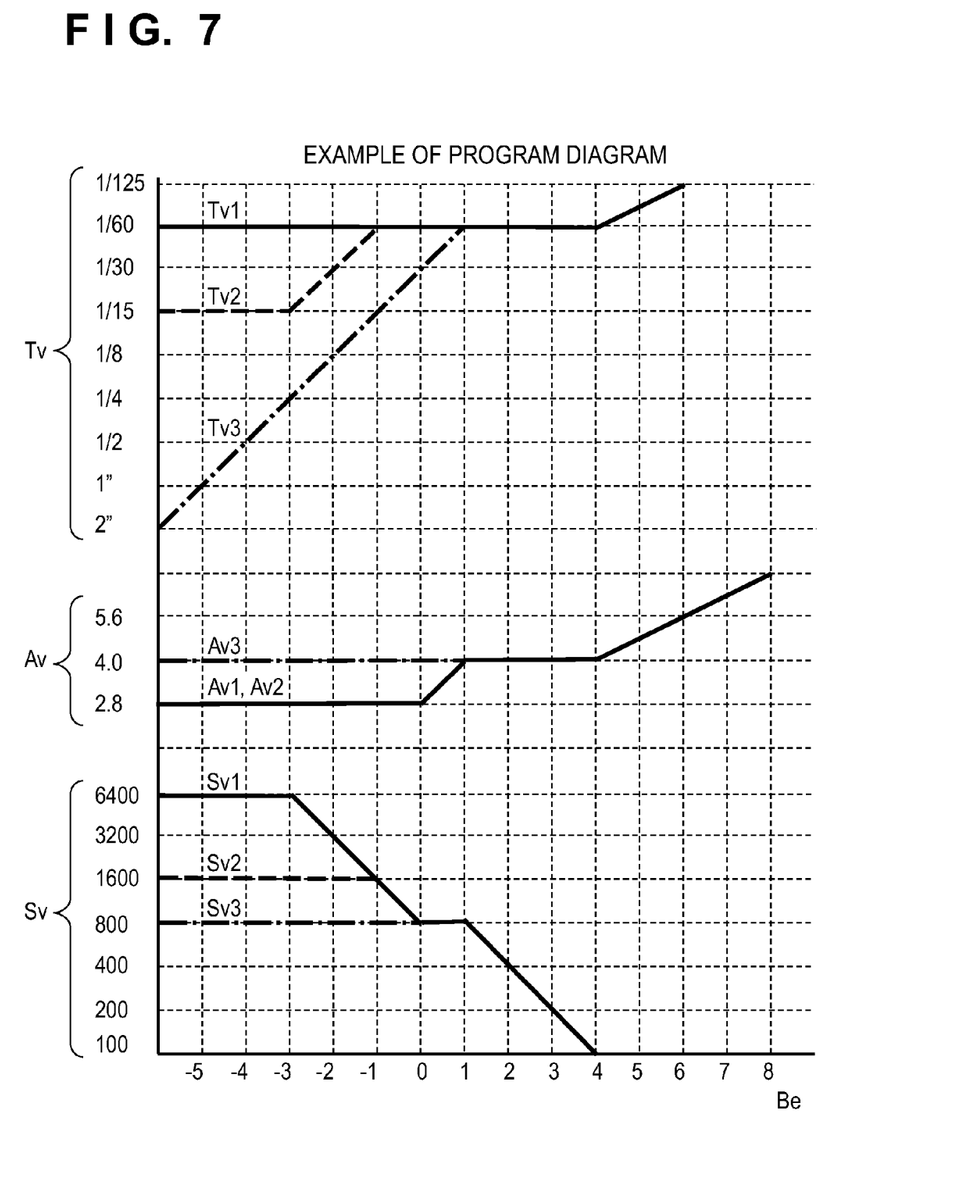
FIG. 7 illustrates a program diagram used in determining the exposure settings of the digital camera 100 according to the embodiment of the present invention.

In step S606, the control unit 101 selects Tv3, Av3, or Sv3, indicated by an alternate long and short dashed line in FIG. 7, for each of the shutter speed, aperture value, and sensitivity of the exposure settings. The control unit 101 determines the exposure settings for the weighted average luminance information Be calculated in step S601. Note that FIG. 7 shows program diagram lines indicating the values of the shutter speed Tv, aperture value Av, and sensitivity Sv for adjusting to appropriate exposure a main subject set for the weighted average luminance information Be.

As shown in FIG. 7, under a luminous condition in which the weighted average luminance information Be is higher than 4, of Tv3, Av3, and Sv3 indicated by alternate long and short dashed lines, the sensitivity stays constant at 100 while the shutter speed and aperture value change, as indicated by solid lines. Also, under the condition in which the weighted average luminance information Be is from 4 to 1, the shutter speed (the exposure time, that is, the Tv value) stays constant at 1/60 sec, the aperture value stays constant at 4.0, and the sensitivity changes from 100 to 800. Moreover, under the condition in which the weighted average luminance information Be is lower than 1, the aperture value stays constant at 4.0, the sensitivity stays constant at 800, and the shutter speed, that is, the Tv value changes to be lower than 1/60 sec.

Note that it is generally necessary to set the shutter speed (Tv value) to a minimum speed value, so the shutter speed (Tv value) is selected from values of 2 sec or less.

The exposure settings are determined in this step using outputs from sensors including the shake detection unit 207 of the exchangeable lens 200, when the shake amount falls within a predetermined range, that is, it is highly probable that the digital camera 100 is fixed on, for example, a tripod. Hence, especially the shutter speed (Tv value) of the exposure settings is determined based on the program diagram line of Tv3. That is, in the above-mentioned exposure settings, a shake is less likely to act on the digital camera 100, so in image capturing of a low-luminance subject, such as night scene image capturing, the subject is exposed for a long time upon setting the sensitivity as low as, for example, 800 to keep noise included in the image capturing result low and thereby obtain appropriate exposure for the subject, so an image capturing result with high image quality can be output.

On the other hand, if the control unit 101 determines that the shake amount does not fall within the predetermined range, it determines that a shake is more likely to act on the digital camera 100 because, for example, the photographer grips it with his or her hand, and advances the process to step S607. If the control unit 101 determines that the image capturing information received from the exchangeable lens 200 in step S603 includes no shake information as well, it advances the process to step S607. In step S607, the control unit 101 detects, as the shake amount, a plurality of motion vectors of a subject to be captured, which are sequentially obtained in image capturing processing. Information indicating whether the photographer grips the digital camera 100 with his or hand is quantified based on the detected motion vectors.

Note that in calculating the shake amount using a motion vector, even if the digital camera 100 is fixed on, for example, a tripod, a motion vector may also be detected as the subject moves. Hence, the digital camera 100 is fixed on, for example, a tripod and subjected to no shake, but nonetheless may be erroneously recognized to be gripped with the hand. To prevent this problem, in this embodiment, the shake amount is calculated using a motion vector of a region regarded as the background.

In step S608, the control unit 101 determines whether the shake amount falls within a predetermined range, using the camera shake amount from the motion vector calculated in step S607. More specifically, the control unit 101 determines whether, for example, the scalar quantity of the motion vector, that is, the shake amount is smaller than a predetermined threshold to, in turn, determine whether the shake amount falls within a predetermined range. If the control unit 101 determines that the shake amount falls within the predetermined range, it advances the process to step S609.

In step S609, the control unit 101 selects Tv2, Av2, or Sv2, indicated by a dashed line in FIG. 7, for each of the shutter speed (Tv value), aperture value (Av value), and sensitivity (Sv value) of the exposure settings. The control unit 101 determines the exposure settings for the weighted average luminance information Be calculated in step S601.

As shown in FIG. 7, in the selected program diagram lines, under the condition in which the weighted average luminance information Be is higher than 1, the Tv, Av, and Sv values change similarly to Tv3, Av3, and Sv3, respectively. Also, under the condition in which the weighted average luminance information Be is 1 to 0, the shutter speed (Tv value) stays constant at 1/60 sec, the sensitivity stays constant at 800, and the aperture value changes from 4.0 to 2.8. Moreover, under the condition in which the weighted average luminance information Be is 0 to −1, the shutter speed (Tv value) stays constant at 1/60 sec, the aperture value stays constant at 2.8, and the sensitivity changes from 800 to 1,600. Again, under the condition in which the weighted average luminance information Be is −1 to −3, the aperture value stays constant at 2.8, the sensitivity stays constant at 1,600, and the shutter speed (Tv value) changes from 1/60 sec to 1/15 sec. In other words, the shutter speed (Tv value) is set lower, the aperture value (Av value) is set smaller, and the ISO sensitivity (Sv value) is set higher for Tv2, Av2, and Sv2 than for Tv3, Av3, and Sv3, respectively.

In this step, the reliability of information according to which it is determined that no shake acts on the digital camera 100 is lower than that of information according to which this determination operation is done based on the sensor output, so the image capturing condition can be estimated as that in which the digital camera 100 is less likely to be fixed on, for example, a tripod. However, it is determined by image analysis that no shake acts on the digital camera 100, so the image capturing condition can be estimated as that in which the photographer grips the digital camera 100 with his or her hand (in-hand state), but nonetheless he or she does so relatively stably.

Hence, especially the shutter speed (Tv value) of the exposure settings is determined based on a program diagram line, which sets a shutter speed (Tv2) corresponding to an exposure time (second exposure time) shorter than Tv3, of the three program diagram lines set in advance. With this operation, in image capturing of a low-luminance subject, such as night scene image capturing, as the sensitivity is set to a middle value of, for example, 1,600 to keep noise included in the image capturing result low, and the shutter speed (Tv value) is set to 1/15 sec, an image capturing result with relatively high quality can be output.

On the other hand, if the control unit 101 determines in step S608 that the photographer grips the digital camera 100 with his or her hand, based on the shake amount obtained based on the motion vector, in step S610 it selects Tv1, Av1, and Sv1 indicated by solid lines in FIG. 7. The control unit 101 determines the exposure settings for the weighted average luminance information Be calculated in step S601.

As shown in FIG. 7, in the selected program diagram lines, under the condition in which the weighted average luminance information Be is higher than −1, the Tv, Av, and Sv values change similarly to Tv2, Av2, and Sv2, respectively. Also, under the condition in which the weighted average luminance information Be is −1 to −3, the aperture value stays constant at 2.8, the shutter speed (Tv value) stays constant at 1/60 sec, and the sensitivity changes from 1,600 to 6,400. In other words, the shutter speed (Tv value) is set lower, and the sensitivity (Sv value) is set higher for Tv1 and Sv1 than for Tv2 and Sv2, respectively. On the other hand, Av2 and Av1 are set to the same value.

In this step, the image capturing condition can be estimated as that in which the image capturing result may be influenced by, for example, a camera shake of the photographer. Hence, especially the shutter speed (Tv value) of the exposure settings is determined based on a program diagram line, which sets a shutter speed (Tv1) corresponding to a minimum exposure time (third exposure time) by prioritizing prevention of the image capturing result from being influenced by a shake, of the three program diagram lines set in advance. Note that night scene image capturing can be done even if a relatively high sensitivity (Sv1) is set to compensate for a short exposure time due to factors associated with the shutter speed (Tv1) determined at this time, and a shake occurs.

As for differences among steps S606, S609, and S610 mentioned above, the program diagram lines are determined especially in the range in which the weighted average luminance information Be is low (especially Be≤−1) as:

High Shutter Speed (Short Exposure Time)
$Tv1 \leq Tv2 < Tv3$ Low Shutter Speed (Long Exposure Time)

Small Aperture Value $Av1=Av2<Av3$ Large Aperture Value

Low Sensitivity $Sv3<Sv2<Sv1$ High Sensitivity

In step S611, the control unit 101 transmits to the signal processing unit 102 the information of the exposure settings (shutter speed Tv, aperture value Av, and sensitivity Sv) determined for the weighted average luminance information Be, displays it on the display unit 104, and completes this exposure setting determination processing.

By executing exposure setting determination processing in this way, the control unit 101 can determine exposure settings corresponding to the method of determining the presence/absence of a shake of the digital camera 100.

On the other hand, if the control unit 101 determines the LV display state in step S502, it makes the image sensor 12 output a captured image in step S507. More specifically, the control unit 101 outputs a control signal to the signal processing unit 102 to make the image sensor 12 accumulate signals at predetermined accumulation time intervals, and read out an analog signal from the image sensor 12 with a gain corresponding to a predetermined sensitivity. The signal processing unit 102 applies A/D conversion processing to the readout analog image signal to generate a digital image signal (captured image).

In step S508, the control unit 101 divides the captured image into a predetermined number of areas, and acquires subject luminance information B in a logarithmic compression system for each area. More specifically, first, the control unit 101 adds signal values in each divided area of the captured image, obtained in step S502, for each of R, G, and B colors to calculate R(i), G(i), and B(i). The control unit 101 acquires subject luminance information B(i) in a logarithmic compression system in each area for the obtained sum signal value of each area using equations (1) and (2), as in step S505.

With this arrangement, in the image capturing processing according to this embodiment, subject luminance information B(i) is generated using an image signal captured by the image sensor 12 in an LV screen display state, and an image signal captured by the photometric sensor 26 in a non-LV screen display state. That is, an image used in image analysis to determine the presence/absence of a shake of the digital camera 100 in the above-mentioned exposure setting determination processing may be subject luminance information B(i) obtained from an image signal captured by either of the image sensor 12 and photometric sensor 26.

In step S509, the control unit 101 executes exposure setting determination processing for the subject luminance information B(i) to be captured, which is obtained in step S508, and determines the exposure settings which include the shutter speed (Tv value), aperture value, and sensitivity, and are used in exposure control upon an image capture instruction. Also, the control unit 101 transmits the information of the determined aperture value to the lens control unit 201 of the exchangeable lens 200 via the contact point 28. When the lens control unit 201 receives the information of the aperture value, it makes the third motor driving unit 204 drive the third motor 205 in accordance with this information to control the open/closed state of the stop 31.

In step S510, the control unit 101 displays on the display unit 104 the captured image obtained in step S507. More specifically, the control unit 101 controls the signal processing unit 102 to apply development processing to the captured image, write the obtained image information in the VRAM 103, and display it on the display unit 104. Note that processing in this step is repeatedly performed at a predetermined frame rate for image signals sequentially output from the image sensor 12 to allow the display unit 104 to function as an electronic viewfinder.

In step S511, the control unit 101 acquires a signal indicating a focus state from the captured image obtained in step S507, and makes the exchangeable lens 200 perform a focusing operation based on this information. More specifically, the control unit 101 analyzes a signal indicating the focus state, and transmits a focus lens drive instruction to the exchangeable lens 200 via the contact point 28. When the lens control unit 201 receives the focus lens drive instruction, it makes the second motor driving unit 202 drive the second motor 203 in accordance with this information to change the position of the focus lens. Note that if the signal indicating the focus state corresponds to an in-focus state, the control unit 101 transmits a focus lens driving stop instruction to the exchangeable lens 200 via the contact point 28.

In step S512, the control unit 101 determines whether an image capture instruction has been issued. More specifically, the control unit 101 determines the presence/absence of an image capture instruction in accordance with whether it has received from the operation input unit 108 a control signal indicating that the user has issued an image capture instruction. If the control unit 101 determines that the user has issued an image capture instruction, it advances the process to step S513; otherwise, it returns the process to step S501.

In step S513, the control unit 101 executes an image capture sequence using the exposure settings determined in step S506 or S509 in accordance with an LV display state/non-LV display state, and makes the signal processing unit 102 apply encoding processing of the recording file format to the obtained image. The control unit 101 records the obtained image data on the recording medium 105 in the form of an image file, and completes this image capturing processing.

As described above, the image capturing apparatus according to this embodiment can change the exposure settings in accordance with the shake detection method. More specifically, the image capturing apparatus receives shake information detected by, for example, a sensor which detects a shake, and determines whether it is gripped with the hand or fixed on, for example, a tripod, based on the shake information (first shake determination). Also, the image capturing apparatus sequentially acquires images output upon photoelectric conversion by charge-accumulation type photoelectric conversion elements, and determines whether it is gripped with the hand or fixed on, for example, a tripod, based on an image displacement between the images (second shake determination). The image capturing apparatus changes the exposure settings at the time of image capturing between the case wherein it determines by first shake determination that the shake amount falls within a predetermined range, and that wherein it determines by second shake determination that the shake amount does not fall within the predetermined range.

With this operation, since exposure control is performed in accordance with the reliability of the shake detection method, a desirable image capturing result with high image quality can be obtained in accordance with the state of the image capturing apparatus.

Although the mode in which electronic flash image capturing is not performed has been described in this embodiment, the present invention is also applicable to the mode in which electronic flash image capturing is performed. The present invention is applicable to the case wherein, for example, in a scene in which a person is captured in the background of a night scene, when the exposure settings are determined using preset program diagram lines as described above, and the subject luminance and other factors satisfy predetermined conditions, electronic flash image capturing is performed.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-105469, filed May 2, 2012, which is hereby incorporated by reference herein in its entirety.

What is claimed is:

1. An image capturing apparatus comprising:
a first shake determination unit configured to receive shake information detected by a shake detection unit, and determine whether a shake amount of the image capturing apparatus is smaller than a first predetermined amount, based on the shake information;
a second shake determination unit configured to determine whether the shake amount of the image capturing apparatus is smaller than a second predetermined amount, based on a motion vector obtained based on a plurality of images; and
an exposure control unit configured to control exposure at a time of image capturing,
wherein said exposure control unit changes a settable exposure condition at the time of image capturing between a case where said first shake determination unit determines that the shake amount of the image capturing apparatus is smaller than the first predetermined amount, and a case where said first shake determination unit determines that the shake amount of the image capturing apparatus is not smaller than the first predetermined amount and said second shake determination unit determines that the shake amount of the image capturing apparatus is smaller than the second predetermined amount.

2. The apparatus according to claim 1, wherein said exposure control unit sets an exposure time at the time of image capturing longer when said first shake determination unit determines that the shake amount of the image capturing apparatus is smaller than the first predetermined amount, than when said second shake determination unit determines that the shake amount of the image capturing apparatus is smaller than the second predetermined amount.

3. The apparatus according to claim 1, wherein said exposure control unit sets a maximum exposure time at the time of image capturing longer when said first shake determination unit determines that the shake amount of the image capturing apparatus is smaller than the first predetermined amount, than when said second shake determination unit determines that the shake amount of the image capturing apparatus is smaller than the second predetermined amount.

4. The apparatus according to claim 1, wherein said exposure control unit sets an aperture value at the time of image capturing larger when said first shake determination unit determines that the shake amount of the image capturing apparatus is smaller than the first predetermined amount, than when said second shake determination unit determines that the shake amount of the image capturing apparatus is smaller than the second predetermined amount.

5. The apparatus according to claim 1, wherein said exposure control unit sets a sensitivity at the time of image capturing lower when said first shake determination unit determines that the shake amount of the image capturing apparatus is smaller than the first predetermined amount, than when said second shake determination unit determines that the shake amount of the image capturing apparatus is smaller than the second predetermined amount.

6. The apparatus according to claim 1, wherein when a determination result is not obtained by said first shake determination unit, or when said first shake determination unit determines that the shake amount of the image capturing apparatus is larger than the first predetermined amount, said second shake determination unit determines whether the shake amount of the image capturing apparatus is smaller than the second predetermined amount.

7. An image capturing apparatus comprising:
a first shake determination unit configured to receive first shake information detected by a first shake detection unit, and determine whether a shake amount of the image capturing apparatus is smaller than a first predetermined amount, based on the first shake information;
a second shake determination unit configured to receive second shake information detected by a second shake detection unit with a shake detection accuracy lower than a shake detection accuracy of the first shake detection unit, and determine whether the shake amount of the image capturing apparatus is smaller than a second predetermined amount, based on the second shake information; and
an exposure control unit configured to control exposure at a time of image capturing, wherein said exposure control unit changes a settable exposure condition at the time of image capturing between a case where said first shake determination unit determines that the shake amount of the image capturing apparatus is smaller than the first predetermined amount, and a case where said first shake determination unit determines that the shake amount of the image capturing apparatus is not smaller than the first predetermined amount and said second shake determination unit determines that the shake amount of the image capturing apparatus is smaller than the second predetermined amount.

8. The apparatus according to claim 7, wherein said exposure control unit sets an exposure time at the time of image capturing longer when said first shake determination unit determines that the shake amount of the image capturing apparatus is smaller than the first predetermined amount, than when said second shake determination unit determines that the shake amount of the image capturing apparatus is smaller than the second predetermined amount.

9. The apparatus according to claim 7, wherein said exposure control unit sets a maximum exposure time at the time of image capturing longer when said first shake determination unit determines that the shake amount of the image capturing apparatus is smaller than the first predetermined amount, than when said second shake determination unit determines that the shake amount of the image capturing apparatus is smaller than the second predetermined amount.

10. The apparatus according to claim 7, wherein said exposure control unit sets an aperture value at the time of image capturing larger when said first shake determination unit determines that the shake amount of the image capturing apparatus is smaller than the first predetermined amount, than when said second shake determination unit determines that the shake amount of the image capturing apparatus is smaller than the second predetermined amount.

11. The apparatus according to claim 7, wherein said exposure control unit sets a sensitivity at the time of image capturing lower when said first shake determination unit determines that the shake amount of the image capturing apparatus is smaller than the first predetermined amount, than when said second shake determination unit determines that the shake amount of the image capturing apparatus is smaller than the second predetermined amount.

12. The apparatus according to claim 7, wherein when said first shake determination unit does not obtain a determination result, or when said first shake determination unit determines that the shake amount of the image capturing apparatus is larger than the first predetermined amount, said second shake determination unit determines whether the shake amount of the image capturing apparatus is smaller than the second predetermined amount.

13. A method of controlling an image capturing apparatus, comprising:
a first shake determination step of receiving shake information detected by a shake detection unit, and determining whether a shake amount of the image capturing apparatus is smaller than a first predetermined amount, based on the shake information;
a second shake determination step of determining whether the shake amount of the image capturing apparatus is smaller than a second predetermined amount, based on a motion vector obtained based on a plurality of images; and
an exposure control step of controlling exposure at a time of image capturing, wherein in the exposure control step, a settable exposure condition at the time of image capturing is changed between a case where it is determined in the first shake determination step that the shake amount of the image capturing apparatus is smaller than the first predetermined amount, and a case where it is determined in the first shake determination step that the shake amount of the image capturing apparatus is not smaller than the first predetermined amount and it is determined in the second shake determination step that the shake amount of the image capturing apparatus is smaller than the second predetermined amount.

14. The method according to claim 13, wherein in the exposure control step, an exposure time at the time of image capturing is set longer when it is determined in the first shake determination step that the shake amount of the image capturing apparatus is smaller than the first predetermined amount, than when it is determined in the second shake determination step the shake amount of the image capturing apparatus is smaller than the second predetermined amount.

15. The method according to claim 13, wherein in the exposure control step, a maximum exposure time at the time of image capturing is set longer when it is determined in the first shake determination step that the shake amount of the image capturing apparatus is smaller than the first predetermined amount, than when it is determined in the second shake determination step the shake amount of the image capturing apparatus is smaller than the second predetermined amount.

16. The method according to claim 13, wherein in the exposure control step, an aperture value at the time of image capturing is set larger when it is determined in the first shake determination step that the shake amount of the image capturing apparatus is smaller than the first predetermined amount, than when it is determined in the second shake determination step the shake amount of the image capturing apparatus is smaller than the second predetermined amount.

17. The method according to claim 13, wherein in the exposure control step, a sensitivity at the time of image capturing is set lower when it is determined in the first shake determination step that the shake amount of the image capturing apparatus is smaller than the first predetermined amount, than when it is determined in the second shake determination step the shake amount of the image capturing apparatus is smaller than the second predetermined amount.

18. The method according to claim 13, wherein when a determination result is not obtained in the first shake determination step, or when it is determined in the first shake determination step that the shake amount of the image capturing apparatus is larger than the first predetermined amount, it is determined in the second shake determination step whether the shake amount of the image capturing apparatus is smaller than the second predetermined amount.

19. A method of controlling an image capturing apparatus, comprising:
a first shake determination step of receiving first shake information detected by a first shake detection unit, and determining whether a shake amount of the image capturing apparatus is smaller than a first predetermined amount, based on the first shake information;
a second shake determination step of receiving second shake information detected by a second shake detection unit with a shake detection accuracy lower than a shake detection accuracy of the first shake detection unit, and determine whether the shake amount of the image capturing apparatus is smaller than a second predetermined amount, based on the second shake information; and an exposure control step of controlling exposure at a time of image capturing, wherein in the exposure control step, a settable exposure condition at the time of image capturing is changed between a case where it is determined in the first shake determination step that the shake amount of the image capturing apparatus is smaller than the first predetermined amount, and a case where it is determined in the first shake determination step that the shake amount of the image capturing apparatus is not smaller than the first predetermined amount and it is determined in the second shake determination step that the shake amount of the image capturing apparatus is smaller than the second predetermined amount.

* * * * *